US008256612B1

(12) United States Patent
Wang

(10) Patent No.: US 8,256,612 B1
(45) Date of Patent: Sep. 4, 2012

(54) PROTECTIVE FRAME FOR PORTABLE ELECTRONIC DEVICES

(76) Inventor: Ching Chang Wang, Tainan (TW)

( * ) Notice: Subject to any disclaimer, the term of this patent is extended or adjusted under 35 U.S.C. 154(b) by 0 days.

(21) Appl. No.: 13/246,882

(22) Filed: Sep. 28, 2011

(51) Int. Cl.
*B65D 85/00* (2006.01)
(52) U.S. Cl. .................. 206/320; 206/724; 206/782
(58) Field of Classification Search .......... 206/576, 206/320, 775, 776, 777, 778, 782, 305, 722, 206/724, 701; 224/666, 669, 930, 269
See application file for complete search history.

(56) References Cited

U.S. PATENT DOCUMENTS

| | | | | |
|---|---|---|---|---|
| 6,659,274 B2* | 12/2003 | Enners | ..................... | 206/305 |
| 8,167,127 B2* | 5/2012 | Martin et al. | ................. | 206/320 |
| 2010/0224519 A1* | 9/2010 | Kao | ............................... | 206/320 |
| 2012/0055824 A1* | 3/2012 | Nash | ............................ | 206/320 |
| 2012/0103844 A1* | 5/2012 | Piedra et al. | .................. | 206/320 |
| 2012/0118773 A1* | 5/2012 | Rayner | ........................ | 206/320 |
| 2012/0145576 A1* | 6/2012 | Yang et al. | .................... | 206/320 |

* cited by examiner

*Primary Examiner* — Jacob K Ackun

(57) ABSTRACT

A protective frame for portable electronic devices consists of a main frame and a cover. The main frame is provided with a window, a recessed entry formed in a lower side, at least one positioning projection located at the recessed entry and separated by a groove, and a sliding groove cut in the inner walls of other three sides. The cover is laid on the main frame, having an opening, an engaging projection protruding outward around three sides to slide in and engage with the sliding groove, at least one recessed groove cut in the inner wall to correspond to the positioning projections of the main frame, a positioning projection formed at the end of each recessed groove, and an interlocking groove bored next to the outer edge of each positioning projection. Hence, a portable electronic device can be wrapped up by the protective frame to prevent it from damaged.

2 Claims, 4 Drawing Sheets

PROTECTIVE FRAME FOR PORTABLE ELECTRONIC DEVICES

BACKGROUND OF THE INVENTION

1. Field of the Invention

This invention relates to a protective frame for portable electronic devices, particularly to one available for various colors and wrapped around a portable electronic device to prevent it from damaged in case of colliding, without using any auxiliary tool.

2. Description of the Prior Art

Commonly, most of portable electronic devices (such as computers, communication products and consumer electronics) have a shell made of plastics, which may easily get damaged in case of colliding or dropping down.

Therefore, here comes a new protective frame to overcome the above mentioned disadvantage.

SUMMARY OF THE INVENTION

The object of this invention is to offer a protective frame used to wrap up a portable electronic device to prevent it from damaged due to colliding, without using any auxiliary tool. And a variety of colors is available for the protecting frame.

The protective frame of the invention includes a main frame and a cover. The main frame is provided with a window, a recessed entry formed in a lower side with two ends formed as blocking walls, and a sliding groove cut in the inner walls of three other sides except the lower side. The cover is laid on the main frame, provided with an opening, and an engaging projection protruding outward around three sides except the lower side to slide in and engage with the sliding groove and having two ends formed as blocking walls.

The main frame is characterized by having at least one positioning projection symmetrically located on the recessed entry and separated by a groove, at lest one recessed groove cut in the inner wall of the cover to correspond to the positioning projection of the main frame, a positioning projection formed at the end of each of the recessed grooves, and an interlocking groove bored next to the outer edge of each of the positioning projections of the cover.

The main frame is further provided with plural protecting cushions attached on an inner wall.

BRIEF DESCRIPTION OF DRAWINGS

This invention is better understood by referring to the accompanying drawings, wherein.

DETAILED DESCRIPTION OF THE PREFERRED EMBODIMENT

Figure 1:
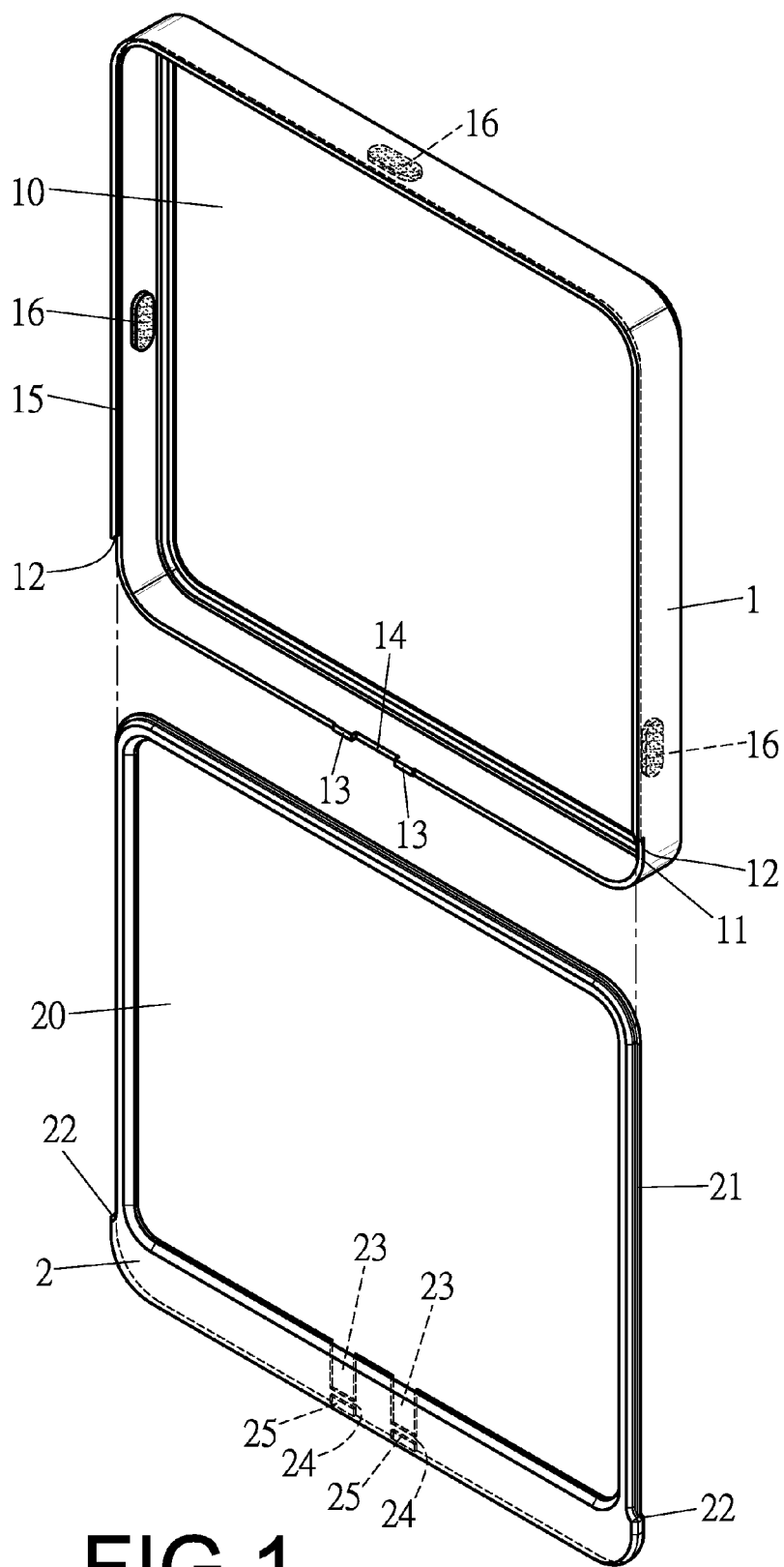
FIG. 1 is an exploded perspective view of a preferred embodiment of a protective frame for portable electronic devices in the present invention.
Figure 2:
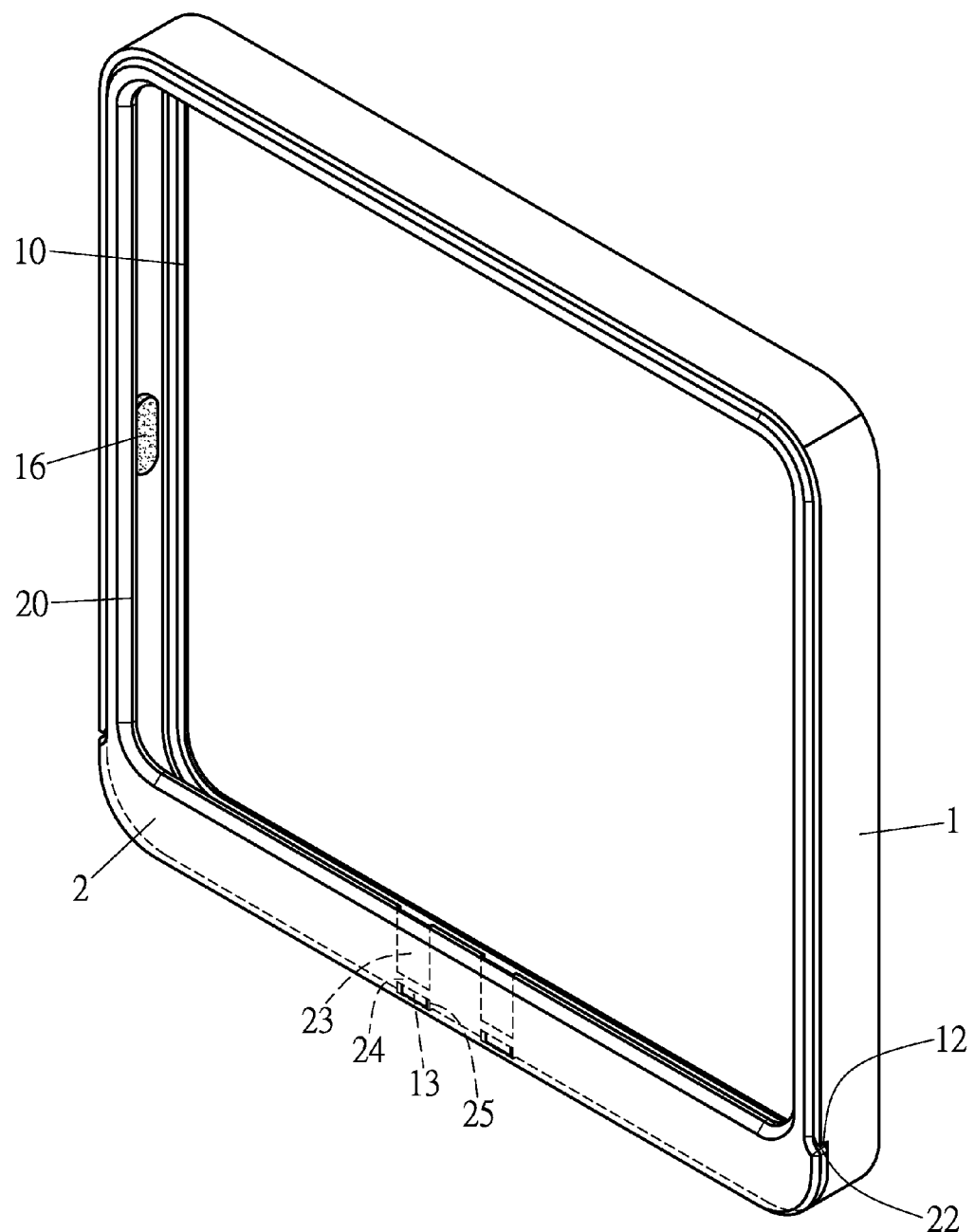
FIG. 2 is a perspective view of the preferred embodiment of a protecting frame for portable electronic devices in the present invention.
Figure 3:
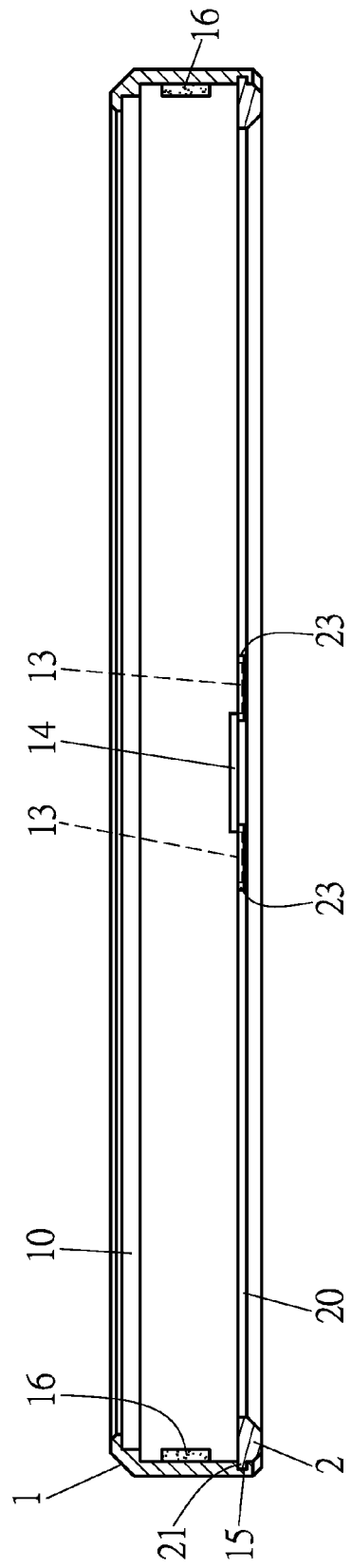
FIG. 3 is a cross-sectional view of the preferred embodiment of a protective frame for portable electronic devices in the present invention.

As shown in FIGS. 1~4, a preferred embodiment of a protective frame for portable electronic devices in the present invention is composed of a main frame 1 and a cover 2.

The main frame 1 is made of metal with various colors, provided with a window 10, a recessed entry 11 formed in a lower side with a blocking wall 12 formed at two ends respectively, two positioning projections 13 symmetrically located at the intermediate portion of the recessed entry 11 and separated by a groove 14, a sliding groove 15 cut in the inner wall of three other sides, and plural protecting cushions 16 attached on the inner wall.

The cover 2 is laid on the main frame 1, provided with an opening 20, an engaging projection 21 protruding outward around three sides except the lower side to correspond to the sliding groove 15 of the main frame 1, and a blocking wall 22 formed at two ends of the engaging projection 21 respectively. Furthermore, the cover 2 is also provided with two recessed grooves 23 cut in the inner wall of a lower side to correspond to the positioning projections 13 of the main frame 1, a positioning projection 24 formed at the end of each of the recessed grooves 23, and an interlocking groove 25 bored next to the outer edge of each of the positioning projections 24.

Figure 4:
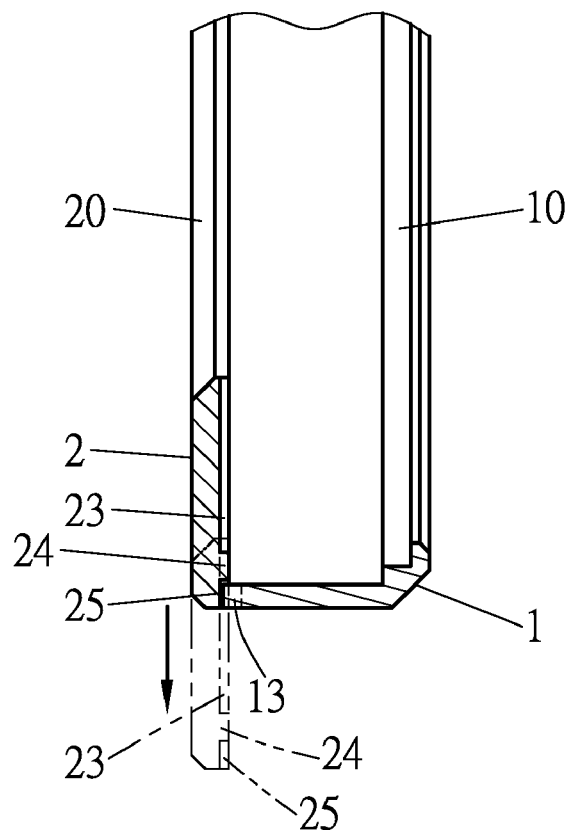
FIG. 4 is a partial cross-sectional view of the preferred embodiment of a protective frame for portable electronic devices in the present invention, showing a cover being pulled out of a main frame.

In using, as shown in FIGS. 1~4, a portable electronic device is first put in and firmly surrounded by the main frame 1. Next, the engaging projection 21 of the cover 2 is aimed at two free ends of the sliding groove 15 of the main frame 1, so that the cover 2 can be restrictively pushed along the sliding groove 15 from the recessed entry 11 into the main frame 1 until the blocking wall 22 of the cover 2 is stopped by the blocking wall 12 of the main frame 1, with the positioning projections 13 moving in the recessed grooves 23 of the cover 2 to interlock with the interlocking grooves 25. By the time, the positioning projections 13 of the main frame 1 and the positioning projections 24 of the cover 2 mutually block with each other to keep the cover 2 from departing from the main frame 1, so as to keep the portable electronic device firmly wrapped by the protective frame of the invention. And the portable electronic device can be protected by the protecting cushions 16 of the main frame 1 from being damaged in case of colliding. As shown in FIG. 4, if the protective frame of the invention is to be taken off the portable electronic device, a user just needs to insert a finger into the groove 14 of the main frame 1 to slightly push up the cover 2. Next, the cover 2 is reversely pulled outward to make the positioning projections 13 of the main frame 1 separated from the interlocking grooves 25 of the cover 2, so that the positioning projections 13 of the main frame 1 are released from the positioning projections 24 of the cover 2 to slide out of the recessed grooves 23 of the cover 2, as shown by the dotted lines in FIG. 4. Then with the engaging projection 21 of the cover 2 moved outward along the sliding groove 15, the cover 2 can be departed from the main frame 1 so that the portable electronic device can be taken off the main frame 1 without taking advantage of any auxiliary tool. Therefore, the protective frame of the invention not only can swiftly wrap up a portable electronic device to be prevented from damage caused by colliding, but also can function as an excellent decoration.

While the preferred embodiment of the invention has been described above, it will be recognized and understood that various modifications may be made therein and the appended claims are intended to cover all such modifications that may fall within the spirit and scope of the invention.

What is claimed is:

1. A protective frame for portable electronic devices, said protective frame comprising:
    a main frame provided with a window and having a lower side formed with a recessed entry having two ends respectively formed as a blocking wall, a sliding groove cut in inner walls of three other sides except said lower side of said main frame; and a cover laid on said main frame and provided with an opening, an engaging projection protruding outward around three sides of said cover to slide in and engage with said sliding groove of said main frame and having two ends formed as blocking walls, and characterized by said main frame having at least one positioning projection symmetrically located on said recessed entry and separated by a groove, at least one recessed groove cut in an inner wall of said cover to correspond to said positioning projection of said main frame, a positioning projection formed at an end of each of said recessed grooves, an interlocking groove bored next to an outer edge of each of said positioning projections of said cover.

2. The protective frame for portable electronic devices as claimed in claim 1, wherein said main frame is further provided with plural protecting cushions attached on an inner wall.

\* \* \* \* \*